(12) United States Patent  
Kokeguchi

(10) Patent No.: US 8,264,423 B2  
(45) Date of Patent: Sep. 11, 2012

(54) METHOD OF DRIVING DISPLAY ELEMENT

(75) Inventor: Noriyuki Kokeguchi, Kokubunji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 625 days.

(21) Appl. No.: 12/449,411

(22) PCT Filed: Jan. 28, 2008

(86) PCT No.: PCT/JP2008/051170  
§ 371 (c)(1), (2), (4) Date: Aug. 6, 2009

(87) PCT Pub. No.: WO2008/102604  
PCT Pub. Date: Aug. 28, 2008

(65) Prior Publication Data  
US 2010/0315391 A1    Dec. 16, 2010

(30) Foreign Application Priority Data

Feb. 21, 2007   (JP) ................. 2007-040617

(51) Int. Cl.  
*G09G 3/18* (2006.01)
(52) U.S. Cl. ........................... 345/53; 345/94
(58) Field of Classification Search .................. 345/107, 345/87, 53, 94  
See application file for complete search history.

(56) References Cited

U.S. PATENT DOCUMENTS

| | | | | |
|---|---|---|---|---|
| 4,240,716 A | | 12/1980 | Camlibel et al. | |
| 5,784,042 A | * | 7/1998 | Ono et al. | 345/94 |
| 5,835,075 A | * | 11/1998 | Nomura et al. | 345/97 |
| 5,933,203 A | * | 8/1999 | Wu et al. | 349/35 |
| 7,300,166 B2 | * | 11/2007 | Agrawal et al. | 359/604 |
| 7,751,111 B2 | | 7/2010 | Kokeguchi | |
| 2002/0191270 A1 | * | 12/2002 | Lu et al. | 359/265 |
| 2004/0119678 A1 | * | 6/2004 | Izumi | 345/94 |
| 2006/0097982 A1 | | 5/2006 | Arai et al. | |
| 2008/0170288 A1 | | 7/2008 | Kokeguchi | |

FOREIGN PATENT DOCUMENTS

| | | |
|---|---|---|
| JP | 08-262501 A | 10/1996 |
| JP | 2003-241227 A | 8/2003 |
| WO | WO 2006/129429 A1 | 12/2006 |
| WO | WO 2007/032117 A1 | 3/2007 |

OTHER PUBLICATIONS

Extended European Search Report dated Jun. 29, 2011 for Application No. EP 08 70 3979.

* cited by examiner

*Primary Examiner* — Kevin M Nguyen  
*Assistant Examiner* — Sepideh Ghafari  
(74) *Attorney, Agent, or Firm* — Holtz, Holtz, Goodman & Chick, PC

(57) ABSTRACT

Provided is a method of driving a display element in which color tone variation of white during repeated drive has been reduced. Also disclosed is a method of driving a display element in which an electrolyte comprising silver or a compound containing silver in a chemical structure thereof is contained between facing electrodes, comprising the step of applying a driving operation to the facing electrodes so as to induce dissolution and deposition of silver, wherein an impression necessary for displaying black color is the impression of a pulse applied to the facing electrodes, satisfying the following Expression (1). Expression (1) $1/100 \leq TBP/TW \leq 1/5$, where TBP represents time width (ms) of one pulse applied in an applied direction necessary for black display, and TW represents the sum of applied time (ms) in an applied direction necessary for white display after conducting the black display employing the applied pulse.

6 Claims, 6 Drawing Sheets

[DRIVE WAVEFORM 1: COMPARATIVE EXAMPLE]

[DRIVE WAVEFORM 2: COMPARATIVE EXAMPLE]

[DRIVE WAVEFORM 3: COMPARATIVE EXAMPLE]

METHOD OF DRIVING DISPLAY ELEMENT

This application is the United States national phase application of International Application PCT/JP2008/051170 filed Jan. 28, 2008.

TECHNICAL FIELD

The present invention relates to a method of driving an electrochemical display element employing dissolution and deposition of silver.

BACKGROUND

Recently, along with enhancement of the operating speed of personal computers, the spread of network infrastructure, and increased and lower-priced mass storage, data of documents or image, which were conventionally printed on paper, can be received simply as electronic information so that opportunities to read such electronic information have increased dramatically.

There were used, as a means for reading electronic information, conventional liquid crystal displays or CRTs and recent emission type displays, such as organic electroluminescence displays. Specifically, when electronic data is document data, it is necessary to notice this reading means over a relatively long period of time. It is hard to say that such an action is a kindly means to humans. There are generally known disadvantages of emission type displays such that flickering tires human eyes, they are awkward to carry about, the reading posture is restricted, it is necessitated to gaze at a stationary picture plane, and electric power consumption increases when reading over a long time.

As a display means to redeem the foregoing disadvantages is known a (memory type) reflective display which employs external light and does not consume electrical power for image retention. However, based on the reasons below, it is hard to say that such displays provide sufficient performance.

For instance, a system using a polarizing plate such as a reflective liquid crystal display exhibits a relatively low reflectance of up to 40%, resulting in difficulty in displaying whiteness and methods of preparing constituent members are not necessarily simple. A polymer dispersed liquid crystal display requires a relatively high voltage and employment of the difference in refractive index between organic compounds does not result in images with sufficient contrast. A polymer networked liquid crystal display has problems such that it requires a relatively high voltage and a complex TFT circuit to enhance memory. An electrophoretic display element needs relatively high voltage of more than 10 V, and there is a concern of durability of the electrophoretic particles, due to their tendency to coagulate. An electrochromic display element, which can be driven at a relatively low voltage of not more than 3 V, has problems that it is insufficient in color quality of black or colors (such as yellow, magenta, cyan, blue, green and red) and its display cells require complex layer arrangement such as a deposit layer to maintain memory.

There is known, as a display system to overcome these disadvantages of the foregoing systems, an electro-deposition (hereinafter, also denoted simply as ED) system which employs dissolution and deposition of metals or metal salts. The ED system, which can be driven at a relatively low voltage of not more than 3 V, exhibits advantages such as simple cell constitution and being superior in black and white contrast and in black color quality. There were disclosed various methods (refer to Patent Documents 1-3, for example).

As a result of the inventor's detailed study of the technique disclosed in the foregoing patent documents, it was confirmed that in the case of conventional techniques, blackened silver liberated from an electrode, which was not possible to be subjected to electrolytic oxidation, was produced during repeated drive of the display element, resulting in variation of while reflectance, whereby there appeared a problem such that white display was darkened.

Patent Document 1: U.S. Pat. No. 4,240,716
Patent Document 2: Japanese Patent No. 3428603
Patent Document 3: Japanese Patent O.P.I. Publication No. 2003-241227

DISCLOSURE OF THE INVENTION

Problems to be Solved by the Invention

The present invention was made on the basis of the above-described situation. It is an object of the present invention to provide a method of driving a display element in which color tone variation of white during repeated drive has been reduced.

Means to Solve the Problems

The above-described object of the present invention can be accomplished by the following structures.

(Structure 1) A method of driving a display element in which an electrolyte comprising silver or a compound containing silver in a chemical structure thereof is contained between facing electrodes, comprising the step of applying a driving operation to the facing electrodes so as to induce dissolution and deposition of silver, wherein an impression necessary for displaying black color is the impression of a pulse applied to the facing electrodes, satisfying the following Expression (1):

$$1/100 \leq TBP/TW \leq 1/5$$

where TBP represents time width (ms) of one pulse applied in an applied direction necessary for black display, and TW represents the sum of applied time (ms) in an applied direction necessary for white display after conducting the black display employing the applied pulse.

(Structure 2) The method of Structure 1, wherein TBP in Expression (1) is 10-50 ms.

(Structure 3) The method of Structure 1 or 2, wherein the electrolyte contains at least one of a compound represented by Formula (1) and a compound represented by Formula (2), and at least one of a compound represented by Formula (3) and a compound represented by Formula (4).

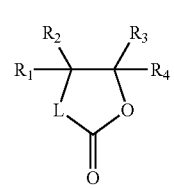

Formula (1)

where L represents an oxygen atom or $CH_2$, and each of $R_1$-$R_4$ represents a hydrogen atom, an alkyl group, an alkenyl group, an aryl group, a cycloalkyl group, an alkoxyalkyl group or an alkoxy group.

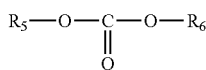

Formula (2)

where each of $R_5$ and $R_6$ represents a hydrogen atom, an alkyl group, an alkenyl group, an aryl group, a cycloalkyl group, an alkoxyalkyl group or an alkoxy group.

Formula (3)

where each of $R_7$ and $R_8$ represents a substituted or unsubstituted hydrocarbon group, but takes no aromatic group when forming a ring including a S atom:

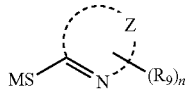

Formula (4)

where M is a hydrogen atom, a metal atom or quaternary ammonium; Z represents a nitrogen-containing heterocycle other than imidazole rings; "n" represents an integer of 0-5; and $R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, a arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic group, provided that when "n" is at least 2, $R_9$s each may be the same or different, and the $R_9$s may be joined to each other to form a condensed ring.

(Structure 4) The method of any one of Structures 1-3, wherein Expression (2) is satisfied, provided that [X] represents a molar concentration (mol/kg) of halogen ions or halogen atoms contained in the electrolyte, and [Ag] represents the total molar concentration (mol/kg) of silver contained in the foregoing electrolyte, or of silver in a compound containing silver in a chemical structure thereof contained in the electrolyte.

$$0 \leq [X]/[Ag] \leq 0.01. \quad \text{Expression (2)}$$

(Structure 5) The method of any one of Structures 1-4, wherein at least one of the facing electrodes is a fluorine-doped tin oxide (FTO) electrode.

Effect of the Invention

In the present invention, provided can be a method of driving a display element in which color tone variation of white during repeated drive has been reduced.

EXPLANATION OF NUMERALS

Figure 1:
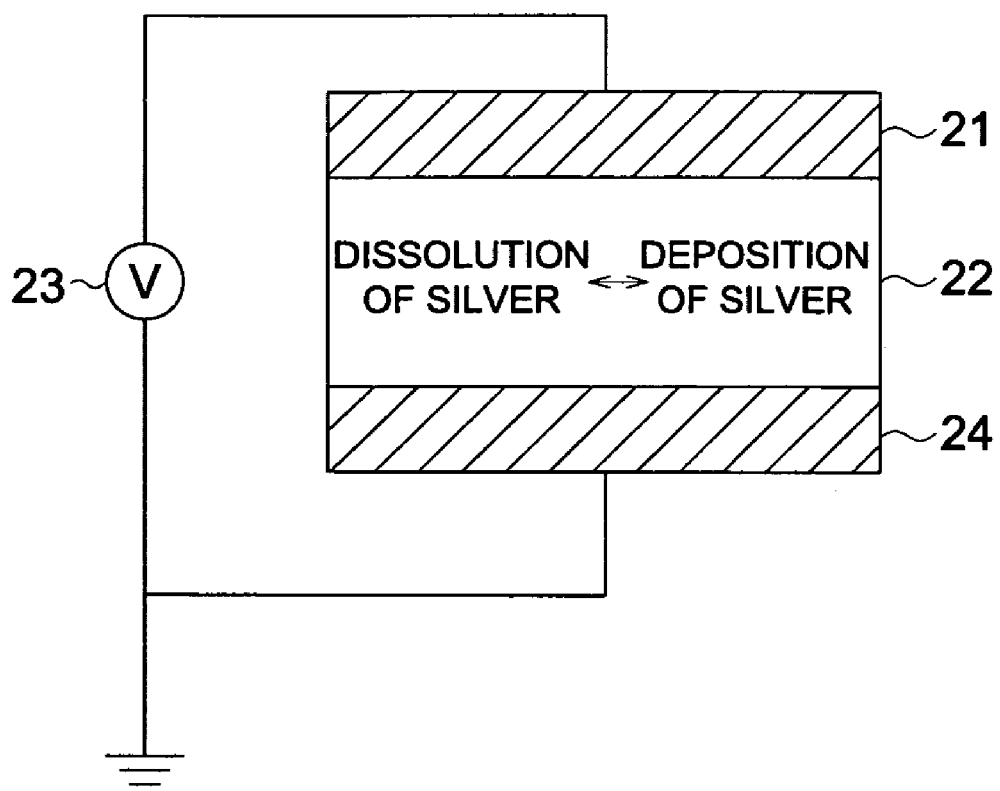
FIG. 1 is a schematic cross-sectional view showing a basic structure of a display element of the present invention.

21 Pixel electrode
22 ED display section
24 Com electrode
34 TFT substrate
42 Gate line
43 Source line
45 Gate electrode
46 Source electrode
47 Drain electrode
48 Semiconductor layer

DESCRIPTION OF THE PREFERRED EMBODIMENTS

Next, preferred embodiments of the present invention will now be described in detail.

After considerable effort during intensive studies on the basis of the above-described situation, the inventor has found out that in accordance with a method of driving a display element in which an electrolyte comprising silver or a compound containing silver in a chemical structure thereof is contained between facing electrodes, comprising the step of applying a driving operation to the facing electrodes so as to induce dissolution and deposition of silver, when time width (ms) of one pulse applied in the applied direction necessary for black display with respect to the facing electrodes is designated as TBP, and the sum of applied time (ms) in the applied direction necessary for white display after conducting the black display employing the applied pulse is designated as TW, arranged is a method of driving a display element by which a pulse is applied under the condition of the ratio of TBP/TW of at least 1/100 and not more than 1/5 to realize a method of driving a display element exhibiting reduced variation of white color tone during repeated drive, and thus the inventor has accomplished the present invention.

Next, a method of driving a display element of the present invention will now be detailed.

The display element of the present invention is an ED system display element having an electrolyte, comprising silver or a compound containing silver in its chemical structure, between facing electrodes, and conducting a driving operation of the facing electrodes to induce dissolution and deposition of silver.

[Silver, or Compound Containing Silver in its Chemical Structure]

Silver, or a compound containing silver in its chemical structure, according to the present invention, is common designations of a compound such as silver oxide, silver sulfide, metallic silver, colloidal silver particles, sliver halide, silver complex compound, or a silver ion. The phase states such as a solid state, a state solubilized to liquid, a gas state, and charging state types such as neutral, anionic or cationic are not particularly considered.

[Basic Structure of Cell]

FIG. 1 is a schematic cross-sectional view showing a basic structure of a display element of the present invention.

As shown in FIG. 1, the display element of the present invention holds electrolyte (referred to also as electrolyte layer) 22 between a pair of facing electrodes 21 and 24. Dissolution reaction or deposition reaction of silver contained in electrolyte 22 is generated via application of voltage or current to facing electrode 21 from power supply 23, whereby in the display element, the display state is varied by utilizing differences in optical properties of a compound containing silver such as transmission and absorption of light.

[Method of Driving Display Element]

In a method of driving a display element of the present invention, it is preferred to conduct driving operation for black display by continuously depositing blackened silver via application of voltage lower than deposition overvoltage after depositing the blackened silver via application of voltage higher than the deposition overvoltage. Performing such the driving operation results in reduction in writing energy, reduced load of the drive circuit and enhanced writing speed with respect to the image plane. Existence of overvoltage in the electrode reaction is generally known in the field of electrochemistry. The overvoltage is detailed in, for example, "Chemistry of Electron Transfer/Introduction of Electrochemistry" (1996, published by Asakura Shoten) on page 121. The display element of the present invention is regarded as an electrode reaction of an electrode and silver within an electrolyte so that existence of an overvoltage in dissolution and deposition of silver is readily understand. Since the magnitude of an overvoltage controls an exchange current density, from the fact that after formation of blackened silver, deposition of blackened silver can be continued via application of voltage lower than the deposition overvoltage, it is assumed that the surface of blackened silver can readily make electron injection because of reduced excess electrical energy.

As to a method of driving a display element of the present invention, when time width (ms) of one pulse applied in the applied direction necessary for black display with respect to the facing electrodes is designated as TBP, and the sum of applied time in the applied direction necessary for white display after conducting the black display employing the applied pulse is designated as TW, it is a feature that a pulse is applied under the condition of the ratio of TBP/TW of at least 1/100 and not more than 1/5.

In the case of an electrolytic deposition/dissolution type display element of the present invention, unevenness in space current density around an electrode is usually generated for the reasons of electric field emerging from difference in gap between facing electrodes, mass transfer caused by ionic diffusion or convection, action of electrolyte additives, fluctuation of externally applied voltage and so forth. When repeatedly driving a display element without compensating this unevenness, dissolution or deposition reaction is excessively conducted locally, whereby formation of coarse silver and deterioration of the electrode are easily generated. When formed coarse silver is liberated from the electrode surface, resulting in no electron injection, the coarse silver is stably present in an electrolyte, whereby white reflectance during white display is degraded. In the case of a display element of the present invention exhibiting excellent memory performance in particular, this causes a serious problem. In the case of a viologen based electrochromic display element, this causes no serious problem since the product produced via the foregoing extreme reaction spontaneously returns to the reset state because of aging. When as the action of the present invention, supplied is a pulse applied during black display associated with voltage application in the direction of white display to suppress reaction at the site of low current density, formation of blackened silver is arranged to be set at the reaction site of high current density, and reaction evenness of each drive operation is improved, formation of coarse silver during repeated drive can be inhibited.

Figure 2A:
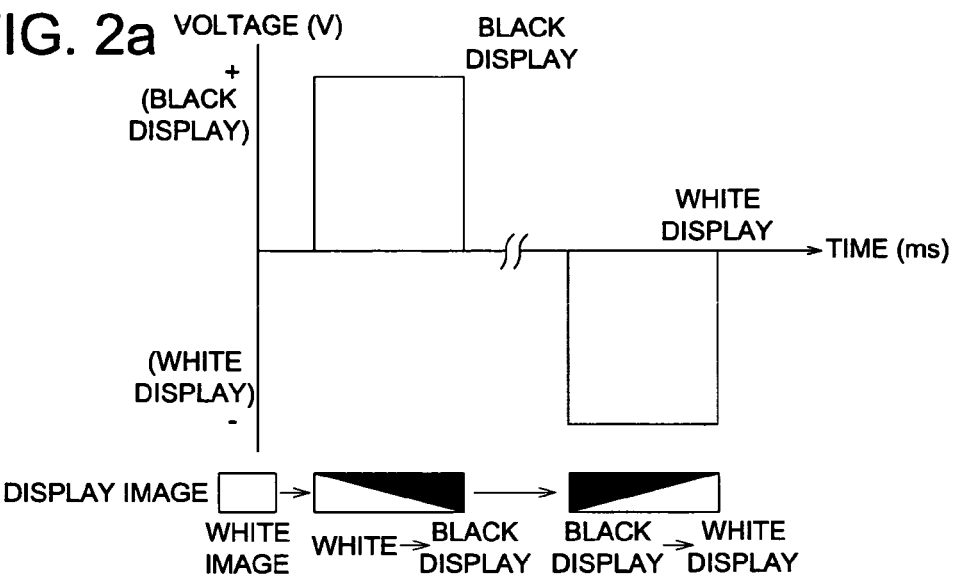
FIG. 2a is a diagram showing an example of the pulse applied when conducting black display or white display with a display element.
Figure 2B:
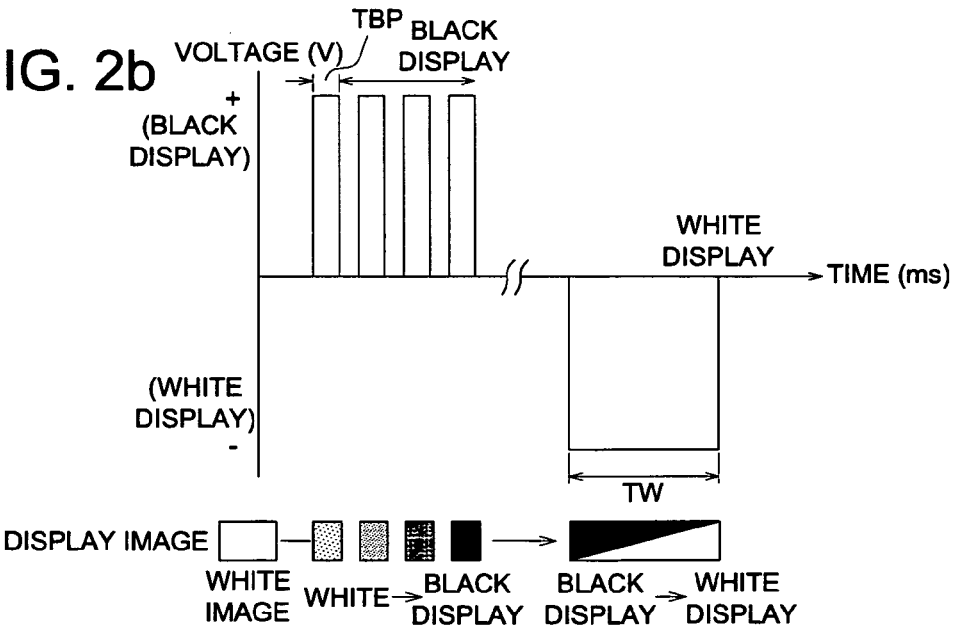
FIG. 2b is a diagram showing another example of the pulse applied when conducting black display or white display with a display element.

Each of FIG. 2a and FIG. 2b is a diagram showing an example of the pulse applied when conducting black display or white display with a display element.

FIG. 2a shows a conventional applied pulse pattern.

In the drawing shown in FIG. 2a, the vertical axis indicates voltage (V) applied to the facing electrode, and the horizontal axis indicates applied time of the voltage (ms). The conventional method is a method by which positive voltage (V) is applied between facing electrodes on the pixel electrode side for a predetermined length of time via one application operation to conduct black display, and subsequently, deposited silver is dissolved by applying negative voltage (V) on the pixel electrode side for a predetermined length of time to conduct white display.

FIG. 2b shows the applied pulse in a method of driving a display element of the present invention. This method is a method by which a plurality of pulses each having short time width (ms) (TBP) are applied as the applied pulse during black display to conduct black display, and when applied time of one applied pulse during black display is designated as TBP, and time applied during white display is designated as TW, TBP/TW is set to at least 1/100 and not more than 1/5. That is, the method is one by which the applied pulse is divided into at least 5 parts and not more than 100 parts during black display with respect to time applied during white display TW. Obtained can be a method of driving a display element in which variation of white color tone during repeating drive is reduced via the above-described effect by taking such the print pulse pattern.

In the present invention, applied time of the pulse applied during black display may be applied time different from each other, and at least one pulse may be within the range satisfying Formula (1). Further, at least 80% of the number of applied pulses is preferably within the range satisfying Formula (1), and the total number of applied pulses is more preferably within the range satisfying Formula (1). Further, the relationship between the sum of time applied during black display (Tb) and the sum of time applied during white display (Tw) preferably satisfies $0.5 \leq (Tb/Tw) \leq 2.0$. In the case of too small Tb/Tw, the rewriting time is retarded, and also in the case of too large Tb/Tw, durability of the element against damage to the electrode or the like becomes insufficient.

[Display Element]

Figure 3:
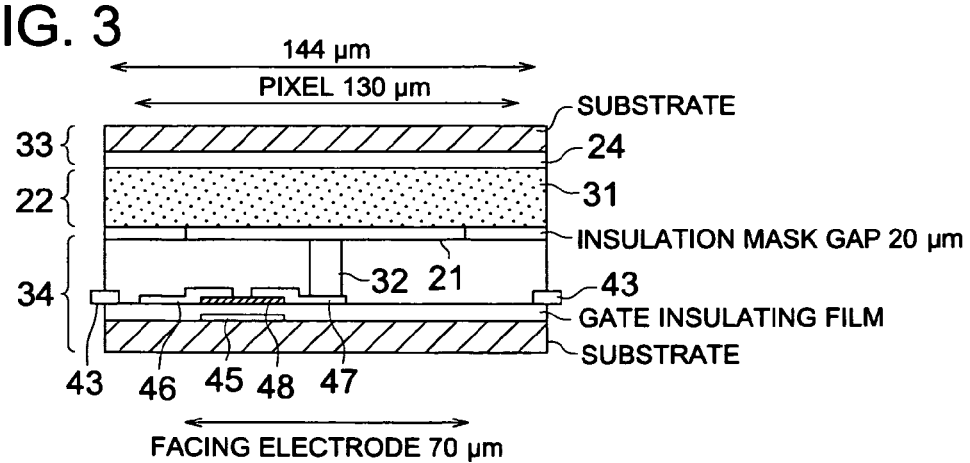
FIG. 3 is a cross-sectional view showing a cell structure of a display element in an ED system of the present invention.

FIG. 3 is a cross-sectional view showing a cell structure of a display element in an ED system of the present invention.

The display element of the present invention possesses TFT substrate 34, transparent electrode 33 and ED display section 22 sandwiched between both the substrates.

Figure 4:
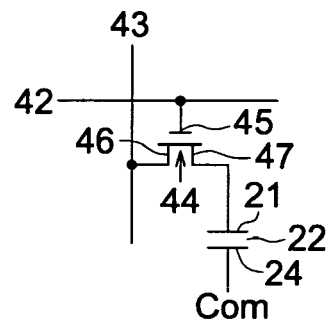
FIG. 4 is a basic TFT circuit diagram in which an ED display element of the present invention is voltage-driven.

In TFT substrate 34, there are wired on a matrix plural source lines 43 and unshown plural gate lines. The region surrounded by source line 43 and gate line (42 in FIG. 4)

corresponds to a single pixel. In each pixel, one switching TFT is formed of gate electrode 45 connected to the gate line (42 in FIG. 4), source electrode 46 connected to source line 43, drain electrode 47 and semiconductor layer 48. Drain electrode 47 is connected to pixel electrode 21 through contact hole 32. Pixel electrode 21 opposes Com electrode 24 through ED display section 22 composed of ion-conductive white scattering layer 31.

The distance between pixel electrode 21 as a facing electrode and Com electrode 24 as opposing electrodes is at least 1 μm and not more than 40 μm. Further, as to the area ratio, the area of Com electrode 24 is 1.3-3.5, based on a blackened image of one pixel being 1.

Herein, the action of a display element of the present invention will be described.

Application of a voltage to gate electrode 45 from an external drive circuit through the gate line (42 in FIG. 4) renders semiconductor layer 48 to be on-state, resulting in conduction between source electrode 46 and drain electrode 47. Since a voltage (for example, Vss) is externally applied to source electrode 46 through source line 43, drain electrode 47 becomes a voltage of Vss. The Vss voltage is applied to pixel electrode 21 through the contact hole. On the other hand, when Com electrode 24 is connected to the ground potential, a voltage of Vss is applied between pixel electrode 21 and Com electrode 24, depositing blackened silver and thereby rendering black display feasible.

When applying the ground potential to the gate electrode, semiconductor layer 48 becomes an off-state and non-conduction between source electrode 46 and drain electrode 47 emerges, resulting in lowered voltage of the drain electrode so that no voltage is applied between pixel electrode 21 and Com electrode 24, maintaining display color before application because of memory performance of the ED element.

In addition, application of a voltage with opposite polarity to when depositing blackened silver dissolves deposited silver to return to white display.

[Drive Circuit]

The TFT circuit to drive an ED display element of the present invention will be described.

Figure 5:
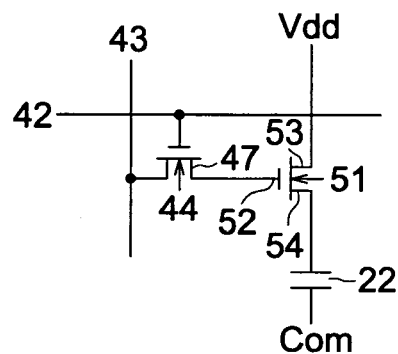
FIG. 5 is a TFT circuit diagram in which an ED display element of the present invention is current-driven.

FIG. 5 shows a basic circuit structure.

The ED display element is provided with a gate line drive circuit to choose each pixel and a source line drive circuit (not shown in the figure) on the end side of gate line 42 and the end side of source line 43, respectively, and there is also provided a signal control section (not shown in the figure) to control the gate line drive circuit and the source line drive circuit. A gate signal is applied to the prescribed gate line 42 by the gate line drive circuit controlled by the signal control section. The gate signal is applied to gate electrode 45 of TFT 44 for switching and TFT 44 becomes on-state. On the other hand, a source signal applied to the prescribed source line 43 is applied from source electrode 46 of TFT 44 to pixel electrode 21 through drain electrode 47, and a source signal voltage is applied to ED display section 22 with being grounded to Com electrode 24, whereby blackened silver is deposited on ED display section side of electrode 24, rendering black display feasible.

Figure 6:
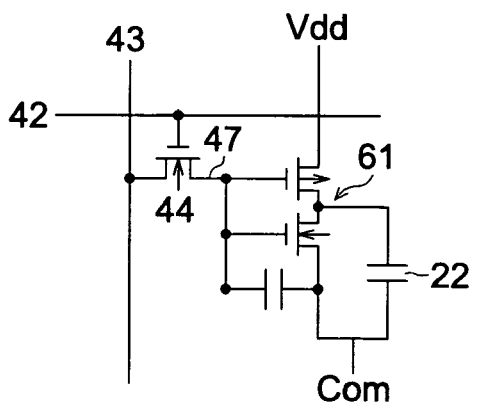
FIG. 6 is a TFT circuit diagram in which an ED display element is current-driven employing an electric potential control means of the present invention.

FIG. 6 to be different from one driven by a voltage drive circuit in FIG. 5 performs displaying by a current drive circuit. In addition to TFT 44 for switching, a power supply line (Vdd) formed along source line 43 and TFT 51 to supply a current to display section 22 through the power supply line (Vdd) are formed in each pixel. Gate electrode 52 of TFT 51, source electrode 53 of TFT 51 and drain electrode 54 of TFT 51 are connected to drain electrode 47 of TFT 44, the power supply line (Vdd) and display section 22, respectively.

Such the current drive circuit can supply a greater current to display section 22, compared to the one shown in FIG. 5, whereby an oxidation reduction reaction can be conducted at higher speed. In addition, in the case of the present embodiment, it is preferred to perform power supply divided into two kinds, for example, 1.5 V for black display and 0 V for white display to the power supply line (Vdd). A flame rate gradation method is suitable for performing gradation display.

Since TFT 44 and TFT 51 are each an N-type TFT, namely a TFT having an electron as a carrier, a-Si can be employed for semiconductor layer 48, and the preparation can be made in the identical process. Further, power supply line (Vdd) is not necessarily formed along source line 43, but may be formed along gate line 42, which may be either one so as to supply power to each pixel.

Figure 7:
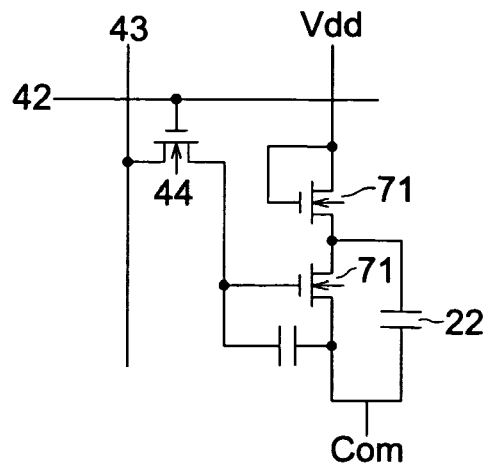
FIG. 7 is a TFT circuit diagram in which CMOS is employed as the electric potential control means in FIG. 5.

FIG. 7 is a circuit diagram showing one provided with a switching means and a potential control means for each pixel in the current drive circuit as described in the foregoing embodiment. Specifically, N-type TFT 44 for switching is used as a switching means, and CMOS 61 composed of a p-type TFT and an N-type TFT is used as a potential control means. The input end of CMOS 61 is connected to drain electrode 47 of TFT 44, while the output end of CMOS 61 is connected to display section 22. By doing this, an oxidation-reduction reaction can be conducted at higher speed, and gradation display by a voltage gradation method can be performed with a potential control means. In addition, since CMOS 61 is used in the present embodiment, a polysilicone is used in the semiconductor layer 48 of TFT. Accordingly, it results in advantageous effects such as reduced electric power consumption or an integrated circumferential drive circuit. Semiconductor layer 48 of TFT 44 for switching can also produce a polysilicone.

FIG. 7 shows one provided with a switching means and a potential control means for each pixel, similarly to FIG. 6. The difference from FIG. 6 is that CMOS is not used as the potential control means, but two TFTs 71 of P-type or N-type are employed. Accordingly, it can be manufactured by using a-Si in the semiconductor layer of TFT without using a polysilicone, resulting in advantages such as easiness in manufacturing. All of these TFTs formed for the respective pixels are an N-type TFT, and a-Si can be used for the semiconductor layer, so that an increase of manufacturing steps can be controlled, as compared to a mixture of P-type and N-type TFTs in each pixel.

Figure 8:
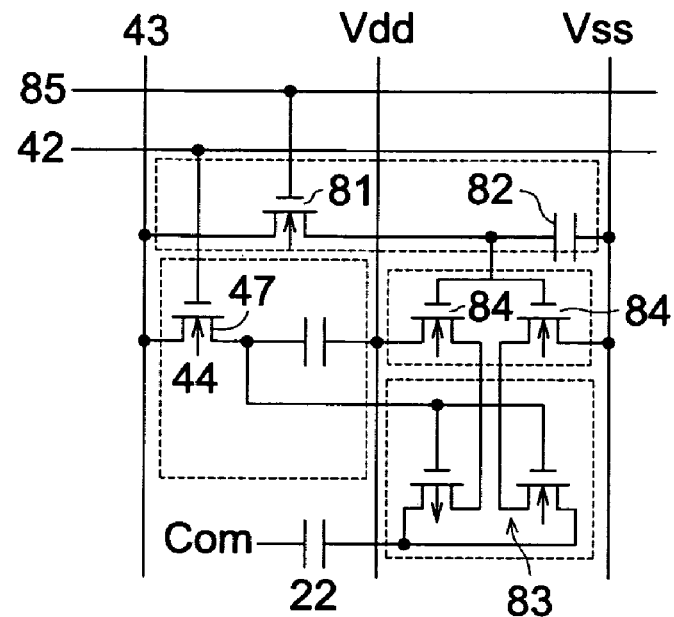
FIG. 8 is a TFT circuit diagram in which an ED display element is current-driven with a rewriting specifying means, an electric potential control means and a power supply cut-off means of the present invention.

FIG. 8 shows a current drive circuit, as described in the foregoing embodiment, which is provided with a switching means, a rewriting specifying means, a potential control means and a power cutoff means. Specifically, the switching means uses TFT 44 for switching, the rewriting specifying means uses N-type TFT 81 and condenser 82, the potential control means uses CMOS 83, and the power cutoff means uses two N-type TFTs 84. The gate electrode of TFT 81 is connected to word line 85 running parallel to gate line 42, the source electrode of TFT 81 is connected to source line 43, while the drain electrode of TFT 81 is connected to condenser 82 and also to each gate electrode of TFT 84. The source electrode of TFT 84 is connected to either one of two power supply lines (Vdd) and (Vss). The drain electrode of TFT 84 is connected to either one of a P-type TFT and a N-type TFT constituting CMOS 83, the input end of CMOS 83 is connected to drain electrode 47 of TFT 44, while the output end of CMOS 83 is connected to display section 22. In this case, necessity of rewriting is specified in each pixel chosen by word line 85 and source line 43. Power supplying is conducted in a pixel which is specified as rewriting being desired and power supplying is not conducted in any pixel which is specified as rewriting being undesired.

In the case of an ED system display element, which has so-called memory performance for display, when display of the corresponding pixel is identical to the one previously chosen, maintaining of display left as it is rather leads to reduction of electric power consumption. Accordingly, a rewriting specifying means and a power cutoff means are provided in each pixel, and when there is no change between the display state previously chosen and the one presently chosen, rewriting being undesired is specified by a rewriting specifying means, and power supplying is cut off in the power cutoff means. When there is a change between the display state previously chosen and one presently chosen, rewriting being desired is specified by a rewriting specifying means, and no power supplying is cut off in the power cutoff means. By doing this, reduction of electric power consumption in the ED display element can be realized. Since CMOS is used in this embodiment, a polysilicone is to be used in the semiconductor layer of TFT.

Figure 9:
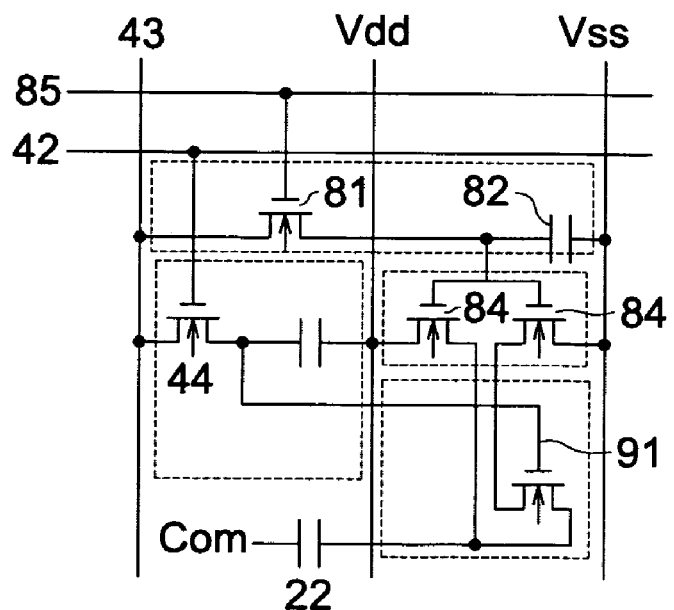
FIG. 9 is a TFT circuit diagram in which is an N-type TFT is employed as the electric potential control means in FIG. 7.

FIG. 9, similarly to FIG. 8 is a circuit diagram provided with a switching means, a rewriting specifying means, a potential control means and a power cutoff means. The difference from FIG. 7 is that the potential control means employs no CMOS 83, but P- or N-type TFT 91 (an N-type is shown in the figure). Therefore, the semiconductor layer of the TFT can be manufactured employing a-Si without using a polysilicone, resulting in easier preparation and so forth. All of the TFTs formed for each pixel are an N-type TFT, and a-Si can be used for the semiconductor layer, so that manufacturing steps can be minimized, as compared to those having a mixture of P-type and N-type TFTs in each pixel.

In addition, the circuit diagrams shown in FIGS. 5-9, power supply lines (Vdd) and (Vss) are shown, and the end of the power supply line is connected to a power supply. In this case, it is a concern that the end farther from the power source results in reduction in power supply capability. Accordingly, reduction in power supply capability may be prevented by connecting both ends of the power supply line or by connecting adjacent power supply lines to each other through at least one interconnecting point. If the interconnecting point is in the form of a ladder, power supplying becomes possible to be feasible even though one of the power supply wires is broken.

[Porous White Scattering Layer]

The display element of the present invention may contain a porous white scattering material together with an electrolyte in an electrolytic layer.

A porous white scattering layer of the present invention is preferably formed by coating an aqueous mixture of an aqueous polymer which is substantially insoluble in an electrolytic solvent and a white pigment, followed by drying.

Examples of white pigments applicable in the present invention include titanium dioxide (an anatase type or a rutile type), barium sulfate, calcium carbonate, aluminum oxide, zinc oxide, magnesium oxide, zinc hydroxide, magnesium hydroxide, magnesium phosphate, magnesium hydrogenphosphate, alkaline earth metal salts, talc, kaolin, zeolite, acid clay, glass, as well as organic compounds such as polyethylene, polystyrene, acryl resins, ionomers, ethylene-vinyl acetate copolymer resins, benzoguanamine resins, urea-formalin resins, melamine-formalin resins and polyamide resins. These particles may be used singly or in combination. Also, employed can be voids to alter the refractive index contained in the particles.

In the present invention, of these white pigment particles, there are preferably employed titanium dioxide, zinc oxide, and zinc hydroxide. More preferably employed are titanium dioxide having been subjected to a surface treatment employing inorganic oxides ($Al_2O_3$, $AlO(OH)$, $SiO_2$ or the like, for example). In addition to such the surface treatment, titanium dioxide particles may be subjected to a treatment employing an organic compound such as trimethylolethane, a triethanolamine acetic acid salt or the like.

Of these white particulate materials, titanium oxide or zinc oxide is preferably used in view of prevention of coloring at high temperature or reflectance of the display element originated from the refractive index.

As an aqueous polymer which is substantially insoluble in an electrolytic solvent of the present invention, cited are a water-soluble polymer and a polymer dispersed in an aqueous solvent.

Examples of a water-soluble compound in the present invention include proteins such as gelatin and its derivatives or cellulose derivatives; natural compounds including polysaccharides such as starch, gum arabic, dextran, pullulan and carageenan; and synthetic polymer compounds such as polyvinyl alcohol, polyvinyl pyrrolidone, a acrylamide polymer and their derivatives. Examples of the gelatin derivatives include acetylated gelatin and phthalated gelatin, and examples of polyvinyl alcohol derivatives include a terminal alkyl-modified polyvinyl alcohol and a terminal mercapto-modified polyvinyl alcohol, and also examples of the cellulose derivatives include hydroxyethyl cellulose, hydroxypropyl cellulose and carboxymethyl cellulose. There are also usable compounds described in Research disclosure or Japanese Patent O.P.I. Publication No. 64-13546 on pages 71-75, and high water-absorbing polymers described in U.S. Pat. No. 4,960,681 and Japanese Patent O.P.I. Publication No. 62-245260, such as homopolymers of vinyl monomer containing —COOM or —$SO_3M$ (where M is a hydrogen atom or an alkali metal) and copolymers of the foregoing monomers or those of the monomers and other vinyl monomers (sodium methacrylate, ammonium methacrylate and potassium methacrylate, for example). These binders may be used singly or in combination.

In the present invention, preferably used are gelatin and its derivatives, and polyvinyl alcohol and its derivatives.

Examples of a polymer dispersed in an aqueous solvent include latexes such as natural rubber latex, styrene butadiene rubber, butadiene rubber, nitrile rubber, chloroprene rubber and isoprene rubber; and thermosetting resins in which a polyisocyanate based resin, an epoxy based resin, an acrylic resin, a silicon based resin, a urethane based resin, a urea based resin, a phenol based resin, a formaldehyde based resin, an epoxy-polyamide based resin, a melamine based resin, an alkyd resin based resin or a vinyl based resin is dispersed in an aqueous solvent. Of these polymers, an aqueous polyurethane resin described in Japanese Patent O.P.I. Publication No. 10-76621 is preferably utilized.

The expression "being substantially insoluble in an electrolytic solvent" is defined as a state where an solution amount per 1 kg of electrolytic solvent is at least 0 g and not more than 10 g at a temperature of from −20° C. to 120° C. The solution amount can be determined by a weight measurement method or a component quantitative measurement method via liquid chromatography or gas chromatography.

The aqueous mixture of an aqueous compound and a white pigment in the present invention is preferably in the form of a white pigment dispersed in water in accordance with a commonly known dispersing method. The volume ratio of aqueous compound/white pigment as a mixture ratio is preferably 1-0.01, and more preferably 0.3-0.05.

A medium to coat the aqueous mixture of an aqueous compound and a white pigment may be provided at any position on a constituting component between facing electrodes of the display element, but is preferably provided on the surface of at least one facing electrode. Examples of methods of providing with respect to the medium include a coating system and a liquid-spraying system, including a spray system through gas phase, such as a system of jetting liquid droplets by employing vibration of a piezoelectric element, for example, a ink-jet head of a piezo-system, a bubble jet system (trade name) of jetting liquid droplets by using a thermal head employing bumping, and a spray system of spraying liquid by air pressure or liquid pressure.

A coating system can be chosen from commonly known coating systems, including, for example, an air doctor coater, a blade coater, a rod coater, a knife coater, squeeze coater, a dipping coater, a reverse roller coater, a transfer roller coater, a curtain coater, a double roller v, a slide hopper coater, a gravure coater, kiss roller coater, a bead coater, a cast coater, a spray coater, calender coater, and an extrusion coater.

An aqueous mixture of an aqueous compound and a white pigment which is provided on a medium may be dried by any method of being able to vaporize water. Examples thereof include heating from a heat source, a heating method of using infrared light, and a heating method employing electromagnetic induction. Water vaporization may be conducted under reduced pressure.

The expression "porous" described in the present invention is referred to as the following. The foregoing aqueous mixture of an aqueous compound and a white pigment is coated onto an electrode and dried to form a white scattering material, onto which an electrolytic solution containing silver or a compound containing silver in its chemical structure is provided and sandwiched by facing electrodes and when an electric potential difference is applied between the facing electrodes to cause a dissolution and deposition reaction of silver, ionic kinds are movable and penetrable between the electrodes.

In the display element of the present invention, it is preferred to conduct hardening reaction of the aqueous compound with a hardener during or after coating and drying of the foregoing aqueous mixture.

As a hardener usable in the present invention, cited are hardeners described in, for example, U.S. Pat. No. 4,678,739, col. 41; U.S. Pat. No. 4,791,042; Japanese Patent O.P.I. Publication No. 59-116655, Japanese Patent O.P.I. Publication No. 62-245261, Japanese Patent O.P.I. Publication No. 61-18942, Japanese Patent O.P.I. Publication No. 61-249054, Japanese Patent O.P.I. Publication No. 61-245153, and Japanese Patent O.P.I. Publication No. 4-218044. Specific examples thereof include an aldehyde based hardener (formaldehyde and so forth), an aziridine based hardener, an epoxy based hardener, a vinylsulfone based hardener {N,N'-ethylene-bis(vinylsulfonylacetoamido)ethane and so forth, for example}, a N-methylol based hardener (dimethylol urea and so forth, for example), a boric acid, a metaboric acid, and a polymeric hardener (compounds described in Japanese Patent O.P.I. Publication No. 62-234157). When employing gelatin as an aqueous compound, a vinylsulfone based hardener or chlorotriazine based hardener is preferably used singly or in combination. Further, when employing a polyvinyl alcohol, a boron-containing compound such as a boric acid or a metaboric acid is preferably employed.

These hardening agents are preferably used in an amount of 0.001-1 g per 1 g of an aqueous compound, and more preferably used in an amount of 0.005-0.5 g per 1 g of an aqueous compound. It is feasible to control humidity during a heat treatment or hardening reaction to enhance film strength.

In the display element of the present invention, the electrolyte preferably contains at least one compound represented by foregoing Formula (1) or (2) and at least one compound represented by foregoing Formula (3) or (4).

First, the compound represented by Formula (1) in the present invention will be described.

In Formula (1), L represents an oxygen atom or $CH_2$ and each of $R_1$-$R_4$ represents a hydrogen atom, an alkyl group, an alkenyl group, an aryl group, a cycloalkyl group, an alkoxyalkyl group or an alkoxy group.

Examples of an alkyl group include a methyl group, an ethyl group, a propyl group, an isopropyl group, a t-butyl group, a pentyl group, a hexyl group, a dodecyl group, a tridecyl group, a tetradecyl group and a pentadecyl group; examples of an aryl group include a phenyl group and a naphthyl group; examples of a cycloalkyl group include a cyclopentyl group and a cyclohexyl group; examples of a alkoxyalkyl group include a β-methoxyethyl group and a γ-methoxypropyl group; and examples of an alkoxy group include a methoxy group, an ethoxy group, a propyloxy group, a pentyloxy group, an octyloxy group and a dodecyloxy group.

Specific examples of a compound represented by Formula (1) are shown below, but in the present invention, the present invention is not limited to these exemplified compounds.

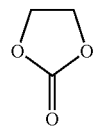

1-1

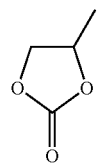

1-2

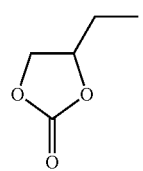

1-3

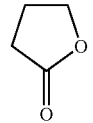

1-4

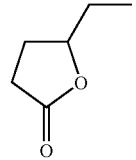

1-5

Next, the compound represented by Formula (2) in the present invention will be described.

In foregoing Formula (2), each of $R_5$ and $R_6$ represents a hydrogen atom, an alkyl group, an alkenyl group, an aryl group, a cycloalkyl group, alkoxyalkyl group or an alkoxy group.

Examples of an alkyl group include a methyl group, an ethyl group, a propyl group, an isopropyl group, a t-butyl group, a pentyl group, a hexyl group, a dodecyl group, a tridecyl group, a tetradecyl group and a pentadecyl group; examples of an aryl group include a phenyl group and a naphthyl group; examples of a cycloalkyl group include a cyclopentyl group and a cyclohexyl group; examples of a alkoxyalkyl group include a β-methoxyethyl group and a γ-methoxypropyl group; and examples of an alkoxy group include a methoxy group, an ethoxy group, a propyloxy group, a pentyloxy group, an octyloxy group and a dodecyloxy group.

Specific examples of a compound represented by Formula (2) in the present invention are shown below, but the present invention is not limited to these exemplified compounds.

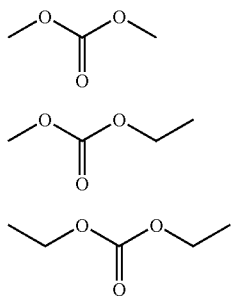

2-1

2-2

2-3

Of compounds represented by Formula (1) and Formula (2) as exemplified above, compounds (1-1), (1-2) and (2-3) are specifically preferable.

The compound represented by foregoing Formula (1) or Formula (2) is one kind of electrolytic solvents, but may be used in combination with other solvents, as long as the objective and effects of the present invention are not deteriorated. Specific examples of such solvents include tetramethylurea, sulfolane, dimethyl sulfoxide, 1,3-dimethyl-2-imidazolidinone, 2-(N-methyl)-2-pyrrolidinone, hexamethylphosphortriamide, N-methylpropioneamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxy ethane, diethoxyfuran, tetrahydrofuran, ethylene glycol, diethylene glycol, triethylene glycol monobutyl ether, and water. Of these solvents described above, it is preferred to contain at least one solvent exhibiting a freezing point of not more than −20° C. and a boiling point of at least 120° C.

Other solvents usable in the present invention include those shown in, for example, J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electorlytes Handbook", Vol. 1, Academic Press (1972).

In the present invention, the electrolytic solvent may be single kind or an admixture with the solvent, but a mixed solvent containing ethylene carbonate is preferable. The addition amount of ethylene carbonate is preferably at least 10% by weight and not more than 90% by weight, based on the total weight of the electrolytic solvent. Specifically preferred electrolytic solvents are a mixed solvent having a weight ratio of propylene carbonate/ethylene carbonate of from 7/3 to 3/7. A propylene carbonate ratio exceeding 7/3 results in deteriorated ionic conductivity and lowered response speed, and a propylene carbonate ratio of less than 3/7 easily forms precipitates at low temperature.

As to the display element of the present invention, the compound represented by Formula (3) as well as the compound represented by Formula (1) or Formula (2) is preferably used.

In foregoing Formula (3), each of $R_7$ and $R_8$ represents a substituted or unsubstituted hydrocarbon group, and contains an aromatic straight chain or branched group. The hydrocarbon group may contain at least one selected from the group consisting of a nitrogen atom, oxygen atom, phosphorus atom, a sulfur atom and a halogen atom. However, when forming a ring containing an S-atom, an aromatic group is not included.

Examples of a group capable of being substituted in place of the hydrocarbon group include an amino group, a guanidine group, a quaternary ammonium group, a hydroxy group, a halogen compound, a carboxylic acid group, a carboxylate group, an amido group, a sulfinic acid group, a sulfonic acid group, a sulfate group, a phosphonic acid group, a phosphate group, a nitro group and a cyano group.

In general, in order to produce dissolution and deposition of silver, silver should be solubilized in the electrolyte. It is common that a means to convert silver or a compound containing silver into a solbilized material by coexisting a compound having a chemical structure kind exhibiting interaction with silver so as to produce, for example, a coordinate linkage withy silver or a weak covalent bond with silver. As the foregoing chemical structure kind, known are a halogen atom, a mercapto group, a carboxyl group and an imino group, but in the present invention, a thio-ether group also effectively acts as a solvent for silver, exerts little effect on coexisting compounds and exhibits high solubility in a solvent.

Specific examples of the compound represented by Formula (3) in the present invention are shown below, but the present invention is not limited to these exemplified compounds.

3-1: $CH_3SCH_2CH_2OH$
3-2: $HOCH_2CH_2SCH_2CH_2OH$
3-3: $HOCH_2CH_2SCH_2CH_2SCH_2CH_2OH$
3-4: $HOCH_2CH_2SCH_2CH_2SCH_2CH_2SCH_2CH_2OH$
3-5:
  $HOCH_2CH_2SCH_2CH_2OCH_2CH_2OCH_2CH_2SCH_2CH_2OH$
3-6:
  $HOCH_2CH_2OCH_2CH_2SCH_2CH_2SCH_2CH_2OCH_2CH_2OH$
3-7: $H_3CSCH_2CH_2COOH$
3-8: $HOOCCH_2SCH_2COOH$
3-9: $HOOCCH_2CH_2SCH_2CH_2COOH$
3-10: $HOOCCH_2SCH_2CH_2SCH_2COOH$
3-11:
  $HOOCCH_2SCH_2CH_2SCH_2CH_2SCH_2SCH_2COOH$
3-12: $HOOCCH_2CH_2SCH_2CH_2SCH_2CH(OH)$
  $CH_2SCH_2CH_2SCH_2CH_2COOH$
3-13: $HOOCCH_2CH_2SCH_2CH_2SCH_2CH(OH)CH(OH)$
  $CH_2SCH_2CH_2SCH_2CH_2COOH$
3-14: $H_3CSCH_2CH_2CH_2NH_2$
3-15: $H_2NCH_2CH_2SCH_2CH_2NH_2$
3-16: $H_2NCH_2CH_2SCH_2CH_2SCH_2CH_2NH_2$
3-17: $H_3CSCH_2CH_2CH(NH_2)COOH$
3-18:
  $H_2NCH_2CH_2OCH_2CH_2SCH_2CH_2SCH_2CH_2OCH_2CH_2NH_2$
3-19:
  $H_2NCH_2CH_2SCH_2CH_2OCH_2CH_2OCH_2CH_2SCH_2CH_2NH_2$
3-20:
  $H_2NCH_2CH_2SCH_2CH_2SCH_2CH_2SCH_2CH_2SCH_2CH_2NH_2$ 3-21: HOOC(NH$_2$)CHCH$_2$CH$_2$SCH$_2$CH$_2$SCH$_2$CH$_2$CH(NH$_2$)COOH 3-22: HOOC(NH$_2$)CHCH$_2$SCH$_2$CH$_2$OCH$_2$CH$_2$OCH$_2$CH$_2$SCH$_2$CH(NH$_2$)COOH 3-23: HOOC(NH$_2$)CHCH$_2$OCH$_2$CH$_2$SCH$_2$CH$_2$SCH$_2$CH$_2$OCH$_2$CH(NH$_2$)COOH 3-24: H$_2$N(=O)CCH$_2$SCH$_2$CH$_2$OCH$_2$CH$_2$OCH$_2$CH$_2$SCH$_2$C(=O)NH$_2$ 3-25: H$_2$N(O=)CCH$_2$SCH$_2$CH$_2$SCH$_2$C(=O)NH$_2$ 3-26: H$_2$NHN(O=)CCH$_2$SCH$_2$CH$_2$SCH$_2$C(=O)NHNH$_2$ 3-27: H$_3$C(O=)NHCH$_2$CH$_2$SCH$_2$CH$_2$SCH$_2$CH$_2$NHC(O=)CH$_3$ 3-28: H$_2$NO$_2$SCH$_2$CH$_2$SCH$_2$CH$_2$SCH$_2$CH$_2$SO$_2$NH$_2$ 3-29: NaO$_3$SCH$_2$CH$_2$CH$_2$SCH$_2$CH$_2$SCH$_2$CH$_2$CH$_2$SO$_3$Na 3-30: H$_3$CSO$_2$NHCH$_2$CH$_2$SCH$_2$CH$_2$SCH$_2$CH$_2$NHO$_2$SCH$_3$ 3-31: H$_2$N(NH)CSCH$_2$CH$_2$SC(NH)NH$_2$.2HBr 3-32: H$_2$(NH)CSCH$_2$CH$_2$OCH$_2$CH$_2$OCH$_2$CH$_2$SC(NH)NH$_2$.2HCl 3-33: H$_2$N(NH)CNHCH$_2$CH$_2$SCH$_2$CH$_2$SCH$_2$CH$_2$NHC(NH)NH$_2$.2HBr 3-34: [(CH$_3$)$_3$NCH$_2$CH$_2$SCH$_2$CH$_2$SCH$_2$CH$_2$N(CH$_3$)$_3$]$^{2+}$.2Cl$^-$

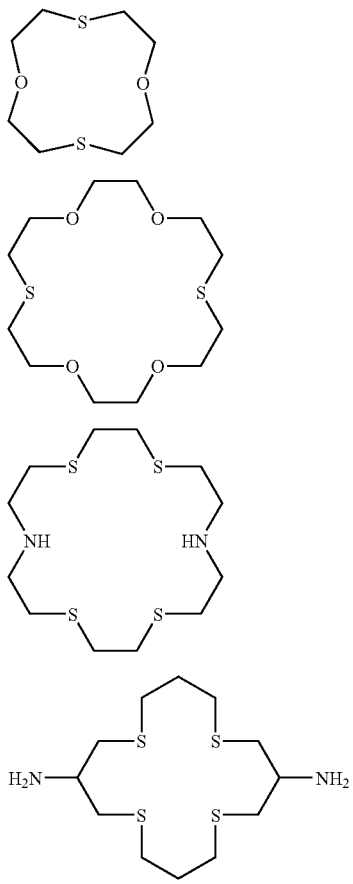

3-35

3-36

3-37

3-38

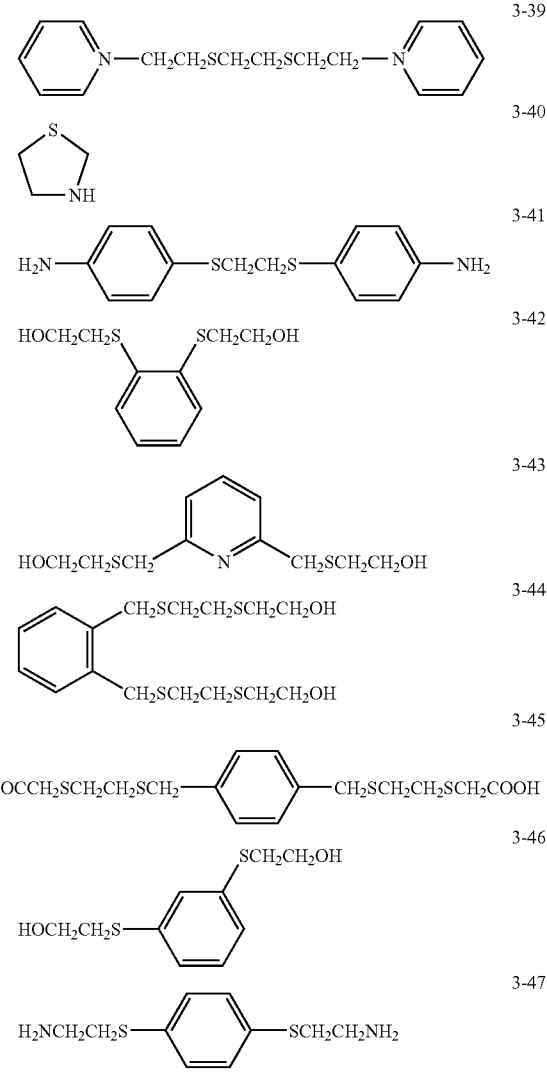

3-39

3-40

3-41

3-42

3-43

3-44

3-45

3-46

3-47

Of the compounds exemplified above, compound 3-2 is specifically preferable in order to produce effects in relation to the objective of the present invention.

Next, the compound represented by Formula (4) in the present invention will be described.

In Formula (4), M represents a hydrogen atom, a metal atom or a quaternary ammonium; Z represents a nitrogen-containing heterocyclic ring except imidazole rings; n is an integer of 0 to 5; R$_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxycarbonyl group, a carboxyl group, a carbonyl group, a sulfonyl group, an amino group, a hydroxy group or a heterocyclic group, but when n is at least 2, each R$_9$ may be identical or different, and a condensed ring may be formed via linkage to each other.

Examples of a metal atom represented by M in Formula (4) include Li, Na, K, Mg, Ca, Zn and Ag. Examples of a quaternary ammonium include $NH_4$, $N(CH_3)_4$, $N(C_4H_9)_4$, $N(CH_3)_3C_{12}H_{25}$ and $N(ch_3)_3CH_2C_6H_5$.

Examples of a nitrogen-containing heterocyclic ring represented by Z in Formula (4) include a tetrazole ring, a triazole ring, an imidazole ring, an oxazole ring, a thiazole ring, an indole ring, an oxazole ring, a benzoxazole ring, a benzimidazole ring, a benzthiazole ring, a benzoselenazole ring and a naphthoxazole ring.

Examples of a halogen atom represented by $R_9$ in Formula (4) include a fluorine atom, a chlorine atom, a bromine atom and an iodine atom; examples of an alkyl group include a methyl group, an ethyl group, a propyl group, an i-propyl group, a t-butyl group, a pentyl group, a cyclopentyl group, a hexyl group, a cyclohexyl group, an octyl group, a dodecyl group a hydroxyethyl group, a methoxyethyl group, a trifluoromethyl group and a benzyl group; examples of an aryl group include a phenyl group and a naphthyl group; examples of an alkylcarbonamide group include an acetylamino group, a propionylamino group and a butyloylamino group; examples of an arylcarbonamido group include benzoylamino and so forth; examples of an alkylsulfoneamido group include a methanesulfonylamino group and an ethanesulfonylamino group; examples of an arylsulfoneamido group include a benzenesulfonylamino group and a toluenesulfonylamino group; examples of an aryloxy group include a phenoxy group; examples of an alkylthio group include a methylthio group, an ethylthio group and a butylthio group; examples of an arylthio group include a phenylthio group and a tolylthio group; examples of an alkylcarbamoyl group include a methylcarbamoyl group, a dimethylcarbamoyl group, an ethylcarbamoyl group, a dimethylcarbamoyl group, a dibutylcarbamoyl group, a piperidylcarbamoyl group and a morpholylcarbamoyl group; examples of an anarylcarbamoyl group include a phenylcarbamoyl group, a methylphenylcarbamoyl group, an ethylphenylcarbamoyl group and a benzylphenylcarbamoyl group; examples of an alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group and a morpholylsulfamoyl group; examples of an arylsulfamoyl group include a phenylsulfamoyl group, a methylphenylsulfamoyl group, an ethylphenylsulfamoyl group and a benzylphenylsulfamoyl group; examples of an alkylsulfonyl group include a methanesulfonyl group, and an ethanesulfonyl group; examples of an arylsulfonyl group include a phenylsulfonyl group, a 4-chlorophenylsulfonyl group and a p-toluenesulfonyl group; examples of an alkoxycarbonyl group include a methoxycarbonyl group, an ethoxycarbonyl group, and a butoxycarbonyl group; examples of an aryloxycarbonyl group include a phenoxycarbonyl group and so forth; examples of an alkylcarbonyl group include an acetyl group, a propionyl group and a butyloyl group; examples of an arylcarbonyl group include a benzoyl group and an alkylbenzoyl group; examples of an acyloxy group include an acetyloxy group, a propionyoxy group and a bytyloyloxy group; and examples of a heterocyclic group include groups of an oxazole ring, thiazole ring, triazole ring, selenazole ring, tetrazole ring, oxazole ring, thiadiazole ring, thiazine ring, triazine ring, benzoxazole ring, benzthiazole ring, indolenine ring, benzoselenazole ring, naphthothiazole ring, triazaindolidine ring diazaindolidine ring and tetrazaindolidine. These substituents include those further having a substituent.

Preferable examples of the compound represented by Formula (4) are shown below, but the present invention is not limited thereto.

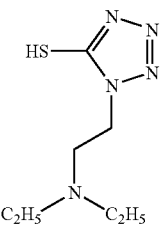

4-1

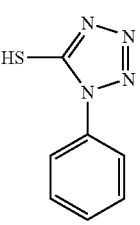

4-2

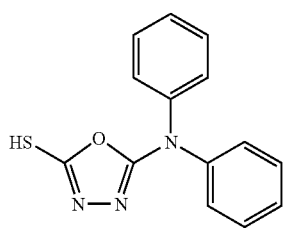

4-3

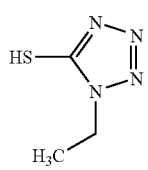

4-4

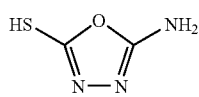

4-5

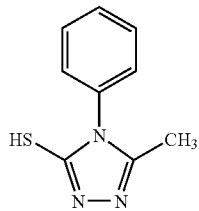

4-6

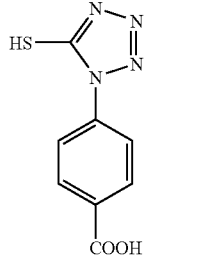

4-7

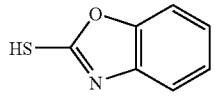

4-8

-continued 4-9
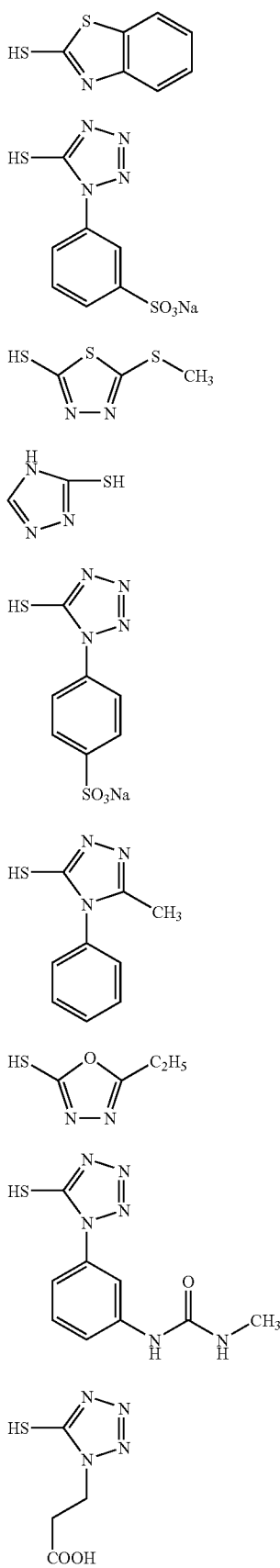

4-10

4-11

4-12

4-13

4-14

4-15

4-16

4-17

4-18

4-19

Of the compounds exemplified above, exemplified compounds 4-12 and 4-18 are specifically preferable in view of achieving effects in relation to the objective of the present invention.

In the display element of the present invention, the condition specified by the following Expression (2) is preferably satisfied, provided that [X] represents the molar concentration (mol/kg) of halogen ions or halogen atoms contained in an electrolyte; and [Ag] represents the total molar concentration (mol/kg) of silver contained in the foregoing electrolyte, or of silver in a compound containing silver in its chemical structure contained in the foregoing electrolyte.

$$0 \leq [X]/[Ag] \leq 0.01 \qquad \text{Expression (2)}$$

The halogen atoms of the present invention refer to iodine atoms, chlorine atoms, bromine atoms or fluorine atoms. A ratio [X]/[Ag] exceeding 0.01 produces $X^- \rightarrow X_2$ during oxidation-reduction reaction of silver, and the $X_2$ readily cross-oxidizes blackened silver to allow dissolution of the blackened silver, resulting in reduced memory capacity as one of the causes. The molar concentration ratio of halogen atom with respect to silver is preferably as low as possible. In the present invention, $0 \leq [X]/[Ag] \leq 0.001$ is more preferable. When adding halogen ions, the sum of halogen kinds molar concentration is preferably in the order of [I]<[Br]<[Cl]<[F], in view of improved memory performance.

[Elecrolyte—Silver Salt]

In the display element of the present invention, usable are commonly known silver salt compounds such as silver iodide, silver chloride, silver bromide, silver oxide, silver sulfide, silver citrate, silver acetate, silver behenate, silver p-toluenesulfonate, silver salts with a mercapto-compounds, and silver complexes with an iminodiacetic acids. Of these, silver salts of a halogen, a carboxylic acid or a compound not containing a nitrogen atom capable of coordinating with silver are preferred, such as silver p-toluenesulfonate, for example.

The concentration of silver ions contained in the electrolyte layer relating to the invention is preferably $$0.2 \text{ mol/kg} \leq [Ag] \leq 2.0 \text{ mol/kg}.$$

A silver ion concentration of less than 0.2 mol/kg becomes a dilute silver solution, retarding the driving speed. A silver ion concentration exceedong 2.0 mol/kg deteriorates solubility and disadvantageously tends to cause precipitation during storage at low temperature.

[Electrolyte Material]

In the display element of the present invention, a liquid electrolyte can contain therein the following compounds. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonim borofluoride, tetrabutylammonium borofluoride, and tetrabutylammonium halide. In addition, there are preferably used fused salt electrolyte compositions described in paragraphs [0062]-[0081] of Japanese Patent O.P.I. Publication No. 2003-187881. Further, there are also usable compounds which form oxidation-reduction pairs such as $I^-/I_3^-$, $Br^-/Br_3^-$ and quinone/hydroquinone.

Further, a solid electrolyte can contain therein the following compounds exhibiting electronic or ionic conductivity.

Examples thereof include fluorinated vinyl based polymers containing a perfluorosulfonic acid, polythiophene, polyaniline, polypyrrole, triphenylamines, polyvinylcarbazoles, polymethylphenylsilanes, calcogenides such as $Cu_2S$, $Ag_2S$, $Cu_2Se$, and $AgCrSe_2$, fluorine compounds such as $CaF_2$, $PbF_2$, $SrF_2$, $LaF_3$, $TlSn_2F_5$, and $CeF_3$, lithium salts such as $Li_2SO_4$ and $Li_4SiO_4$ and compounds such as $ZrO_2$, CaO, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$, and $Li_6NBr_3$.

Employed can be electrolytes in gel form as the supporting electrolyte. When electrolytes are nonaqueous, utilized can be oil gelling agents described in paragraphs [0058]-[0059] of JP-A No. 11-185836.

[Thickener Added into Electrolyte]

In the display element of the present invention, there may be used thickeners in the electrolyte. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, polyacrylic acid, and polyurethane as a transparent hydrophobic binder.

These thickening agents may be used in combination. There are further cited the compounds described on pages 71-75 of Japanese Patent Publication No. 64-13546. Of these, polyvinyl alcohols, polyvinylpyrrolidones, hydroxypropyl celluloses, and polyalkylene glycols are preferably used in view of compatibility with various types of additives and enhancement of dispersion stability of white particles.

[Other Additives]

Examples of auxiliary layers for the display element of the present invention include a protective layer, a filter layer, an antihalation layer, a crossover light cutting layer and a backing layer. These auxiliary layers may contain chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbents, anti-irradiation dyes, filter light absorbing dyes, fungicides, polymer latexes, heavy metals, antistatic agents and matting agents.

The additives described above are detailed in Research Disclosure (hereinafter denoted simply as RD) Volume 176 Item/17643 (December 1978), RD Volume 184 Item/18431 (August 1979), RD Volume 187 Item/18716 (November 1979), and RD Volume 308 Item/308119 (December 1989).

Kinds of compounds and sections thereof disclosed in these 3 RDs are listed below.

| Additives | RD 17643 Page | RD 17643 Section | RD 18716 Page | RD 18716 Section | RD 308119 Page | RD 308119 Section |
|---|---|---|---|---|---|---|
| Chemical sensitizers | 23 | III | 648 | right top | 96 | III |
| Sensitizing dyes | 23 | IV | 648-649 | | 996-8 | IV |
| Desensitizing dyes | 23 | IV | | | 998 | IV |
| Dyes | 25-26 | VIII | 649-650 | | 1003 | VIII |
| Development accelerators | 29 | XXI | 648 | right top | | |
| Antifoggant stabilizer | 24 | IV | 649 | right top | 1006-7 | VI |
| Optical brightening agents | 24 | V | | | 998 | V |
| Hardeners | 26 | X | 651 | left | 1004-5 | X |
| Surfactants | 26-7 | XI | 650 | right | 1005-6 | XI |
| Antistatic agents | 27 | XII | 650 | right | 1006-7 | XIII |
| Plasticizers | 27 | XII | 650 | right | 1006 | XII |
| Lubricants | 27 | XII | | | | |
| Matting agents | 28 | XVI | 650 | right | 1008-9 | XVI |
| Binders | 26 | XXII | | | 1003-4 | IX |
| Supports | 28 | XVII | | | 1009 | XVII |

[Layer Configuration]

The constituting layers to be provided between facing electrodes in the display element of the present invention will further be described.

As the constituting layer in the display element of the present invention, the constituting layer containing a hole transport material can be provided as a constituting layer. Examples of hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CuSCN, $CuInSe_2$, $Cu(In,Ga)Se$, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

[Substrate]

There are preferably employed as substrates usable in the present invention plastic films composed of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndioctatic structure polystyrenes. These are prepared employing the methods described, for example, in each of Japanese Patent O.P.I. Publication No. 62-117708, Japanese Patent O.P.I. Publication No. 1-46912, and Japanese Patent O.P.I. Publication No. 1-178505. Further, examples of supports include metal substrates including stainless steel, paper supports such as baryta paper or resin coated paper, supports including the above plastic film having thereon a reflection layer, and those which are described in Japanese Patent O.P.I. Publication No. 62-253195 (pages 29-31) as a support. There are also preferably used those described on page 28 of RD No. 17643, from the right column on page 647 to the left column on page 648 of RD No. 18716, and on page 879 of RD No. 307105. As described in U.S. Pat. No. 4,141,735, these supports may be subjected to a thermal treatment at a temperature lower than Tg so that core-set curl is decreased. Further, the surface of these supports may be subjected to a surface treatment with the aim of enhancement of adhesion of the support to other constituting layers. In the invention, there may be employed as surface treatments a glow discharge treatment, an ultraviolet radiation irradiation treatment, a corona treatment and a flame treatment. Further there may be employed supports described on pages 44-149 of Kochi Gijutsu No. 5 (published by AZTEC Corp., dated Mar. 22, 1991). There are further cited "Supports" described on page 1009 of RD No. 308119 and on page 108 of Product Licensing Index Volume 92. In addition, there are also usable glass substrates and epoxy resins kneaded with glass powder.

[Electrode]

In the display element of the present invention, it is preferable that at least one of the facing electrodes is a metal electrode. There may be employed, as a metal electrode, metals such as platinum, gold, silver, copper, aluminum, zinc, nickel, titanium, or bismuth and alloys thereof, which are known in the art. Preferred metals employed in the metal electrodes are those which exhibit a work function near the oxidation-reduction potential of silver in electrolytes. Of these, a silver electrode or an electrode having a silver content of at least 80 percent is advantageous to maintain a reduced state of silver, which also is superior in anti-staining of electrodes. Methods for preparing electrodes can employ conventional ones such as a evaporating method, a printing method, an ink-jet method, a spin coating method, and a CVD method.

Further, the display element of the present invention preferably comprises a transparent electrode as at least one of the facing electrodes. Transparent electrodes are not particularly limited as long as they are transparent and electrically conductive. Examples thereof include indium tin oxide (ITO), indium zinc oxide (IZO), fluorine-doped tin oxide (FTO), indium oxide, zinc oxide, platinum, gold, silver rhodium, copper, chromium, carbon, aluminum, silicon, amorphous silicon, and BSO (bismuth silicon oxide). Such electrodes as described above can be formed, for example, in the manner that an ITO layer may be subjected to mask evaporation on a substrate employing a sputtering method, or after forming an ITO layer on the entire surface, patterning may be performed employing a photolithographic method. The surface resistance value is preferably 100 $\Omega/\square$ or less, and is more preferably 10 $\Omega/\square$ or less. The thickness of the transparent electrodes is not particularly limited, but is commonly 0.1-20 µm.

[Other Constituting Factors for Display Element]

The display element of the present invention may optionally employ sealing agents, column-structure materials, and spacer particles.

Sealing agents are those to seal materials so that they do not leak out. Usable are curing type, thermosetting type, photocuring type, moisture curing type, and anaerobic curing type such as epoxy resins, urethane resins, acryl resins, vinyl acetate resins, ene-thiol resins, silicone resins, or modified polymer resins.

Columnar structure materials provide strong self-supporting (strength) between substrates. Examples thereof include a cylindrical form, a quadrangular form, an elliptic cylindrical form and a trapezoidal form, which are arranged at definite intervals in a specified pattern such as a lattice. Further, there may be employed stripe-shaped ones arranged at definite intervals. It is preferable that the columnar structure materials are not randomly arranged; but arranged at equal intervals, arranged so as to vary the interval gradually, or arranged so as to repeat a predetermined pattern at a definite cycle so that the distance between substrates is appropriately maintained and image display is not hindered. When 1-40% of the display region of a display element is occupied by the columnar structure material, sufficient strength for commercial viability is achieved for a display element.

There may be provided a spacer between paired substrates to maintain a uniform gap between them. Examples of such a spacer include a spherical material composed of a resins or inorganic oxide. Further, adhesion spacers are suitably employed the surface of which is coated with thermoplastic resins. In order to maintain the uniform gap between substrates, there may be provided only columnar structure materials. However, there may be provided both spacers and columnar structure materials. In place of the columnar structure materials, only spacers may be employed as a space-holding member. The diameter of spacers, when a columnar structure material is formed, is not more than its height, and is preferably equal to the height. When no columnar structure material is formed, the diameter of spacers corresponds to the distance of the cell gap.

[Screen Printing]

In the present invention, sealing agents, columnar structure materials and electrode patterns can be formed employing a screen printing method. In the screen printing method, a screen on which predetermined patterns are formed is covered on the electrode surface, and printing materials (compositions to form columnar structure materials such as photo-curing resins) are placed on the screen. Subsequently, a squeegee is moved at a predetermined pressure, angle and rate, whereby the printing material is transferred onto the above substrate via the pattern of the screen. Then, the transferred materials are thermally cured and dried. When columnar structure materials are formed employing the screen printing method, resin materials are not limited to photo-curing resins, but there may also employed, for example, thermosetting resins such as epoxy resins, acryl resins and the like, or thermoplastic resins. Examples of the thermoplastic resin include a polyvinyl chloride resin, a polyvinylidene chloride resin, a polyvinyl acetate resin, a polymethacrylic acid ester resin, a polyacrylic acid ester resin, a polystyrene resin, a polyamide resin, a polyethylene resin, a polypropylene resin, a fluorocarbon resin, a polyurethane resin, a polyacrylonitrile resin, a polyvinyl ether resin, a polyvinyl ketone resin, a polyether resin, a polyvinyl pyrrolidone resin, a saturated polyester resin, a polycarbonate resin, and a chlorinated polyether resin. It is preferable that resin materials are employed in the form of a paste obtained through dissolution in a suitable solvent.

As noted above, after forming the columnar structure material on the substrate, the spacer is provided on at least one side of the substrate, and paired substrates are placed so that the electrode-forming surfaces are opposed to each other, whereby an empty cell is formed. By heating the paired substrates, they are allowed to adhere to each other under application of pressure from both sides, whereby a display cell is obtained. Preparation of a display element may be made by injecting an electrolyte composition between the substrates, employing a vacuum injection method. Alternatively, during attachment of substrates, an electrolyte composition may be dripped on the surface of one of the substrates and then simultaneously sealed when the substrates are allowed to adhere to each other.

[Commercial Application]

It is feasible to apply the display element of the present invention to ID card related fields, public information related fields, transportation related fields, broadcasting related fields, account settling fields, and distribution and logistics related fields. Specific examples thereof include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, residents' basic registers, passports, electronic books and so forth.

EXAMPLE

The present invention will be specifically described referring to Examples, but the present invention is not limited thereto. Terms "part(s)" and "%" used in Examples represent "part(s) by weight" and "% by weight", respectively, unless otherwise noted.

<<Preparation of Display Element>>
[Preparation of display element 1]
(Preparation of electrolytic solution 1)

Into 2.5 g of dimethyl sulfoxide, added were 90 mg of sodium iodide and 75 mg of silver iodide. After the mixture was completely dissolved, 150 mg of polyvinylpyrrolidone (average molecular weight of 15,000) were added, and the mixture was stirred for one hour with heating at 120° C. to obtain electrolytic solution 1.

(Preparation of Electrode 1)

An ITO film having a sheet resistance of 10Ω/□ was formed on a glass substrate in accordance with a commonly known method to obtain a transparent electrode (electrode 1).

(Preparation of Electrode 2)

A TFT element shown in FIG. 3 was prepared on a glass substrate in accordance with a commonly known method. In addition, electrode 21 is formed from a square, 130 μm on a side, and the number of pixels was set to 300 pixels×300 pixels.

(Preparation of Electrode 3)

An aqueous mixture prepared by dispersing 20% by weight of titanium oxide in a 2% by weight aqueous gelatin solution was coated by a wire bar so as to give a thickness of 100 μm, on electrode 2 bordered by an olefin based sealing agent containing glass spherical beads having an average particle diameter of 40 μm at a volume ratio of 10% for peripheral portions, and subsequently water was vaporized via drying at 15° C. for 30 minutes, followed by drying at 45° C. for one hour, whereby electrode 3 fitted with a white scattering layer was prepared.

(Preparation of Display Element)

Electrolytic solution 1 was provided onto electrode 3, being left standing for 30 minutes, and electrolytic solution 1 was sufficiently penetrated so as not to enter air bubbles into a white scattering layer. Thereafter, the resulting layer was covered by electrode 1, followed by heating in pressure to prepare display element 1. A size of a single pixel was set to a square, 130 μm on a side. Further, display element 1 had a deposition overvoltage of 1.0 V.

(Preparation of Display Element 2)

Display element 2 was prepared similarly to preparation of the above-described display element 1, except that dimethylsulfoxide was replaced by propylene carbonate.

(Preparation of Display Element 3)

Display element 3 was prepared similarly to preparation of the above-described display element 1, except that sodium iodide was replaced by exemplified compound 3-3.

(Preparation of Display Element 4)

Display element 4 was prepared similarly to preparation of the above-described display element 1, except that sodium iodide was replaced by exemplified compound 4-2.

(Preparation of Display Element 5)

Display element 5 was prepared similarly to preparation of the above-described display element 4, except that dimethylsulfoxide was replaced by propylene carbonate.

(Preparation of Display Element 6)

Display element 6 was prepared similarly to preparation of the above-described display element 5, except that silver iodide was replaced by silver p-toluenesulfonate.

(Preparation of display element 7)

Display element 7 was prepared similarly to preparation of the above-described display element 6, except that ITO electrode was replaced by FTO electrode.

<<Driving of Display Element (Drive Waveform Pattern)>>

Any one of display elements 1-7 prepared above and any one of drive waveforms 1-9 were used in combination as shown in Table 1, and those were designated as driving methods 1-19.

[Drive Waveform]

Figure 10:
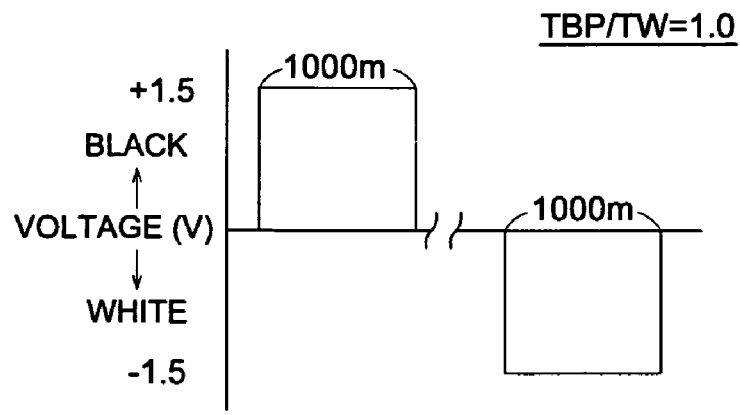
FIG. 10 is a pattern diagram showing drive waveforms of a comparative example employed in EXAMPLE.
Figure 10:
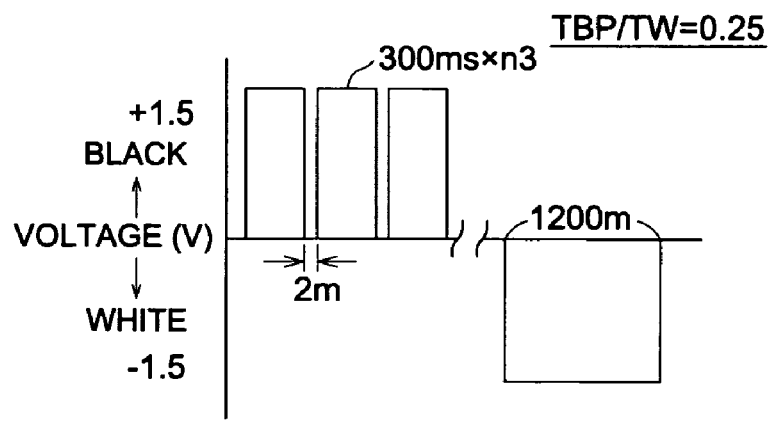
Figure 10:
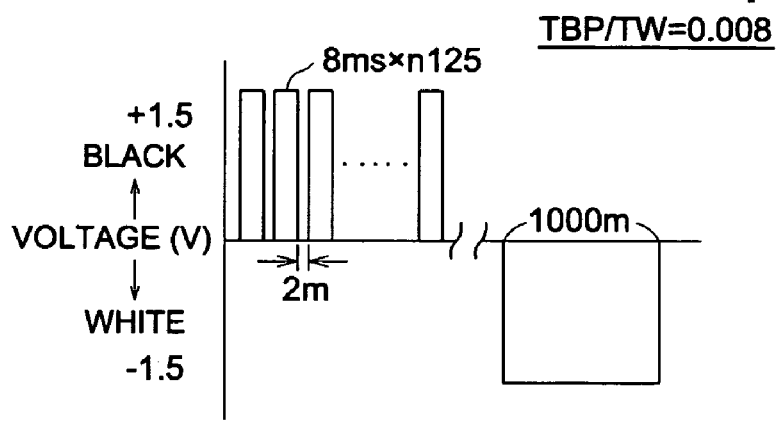
Figure 11:
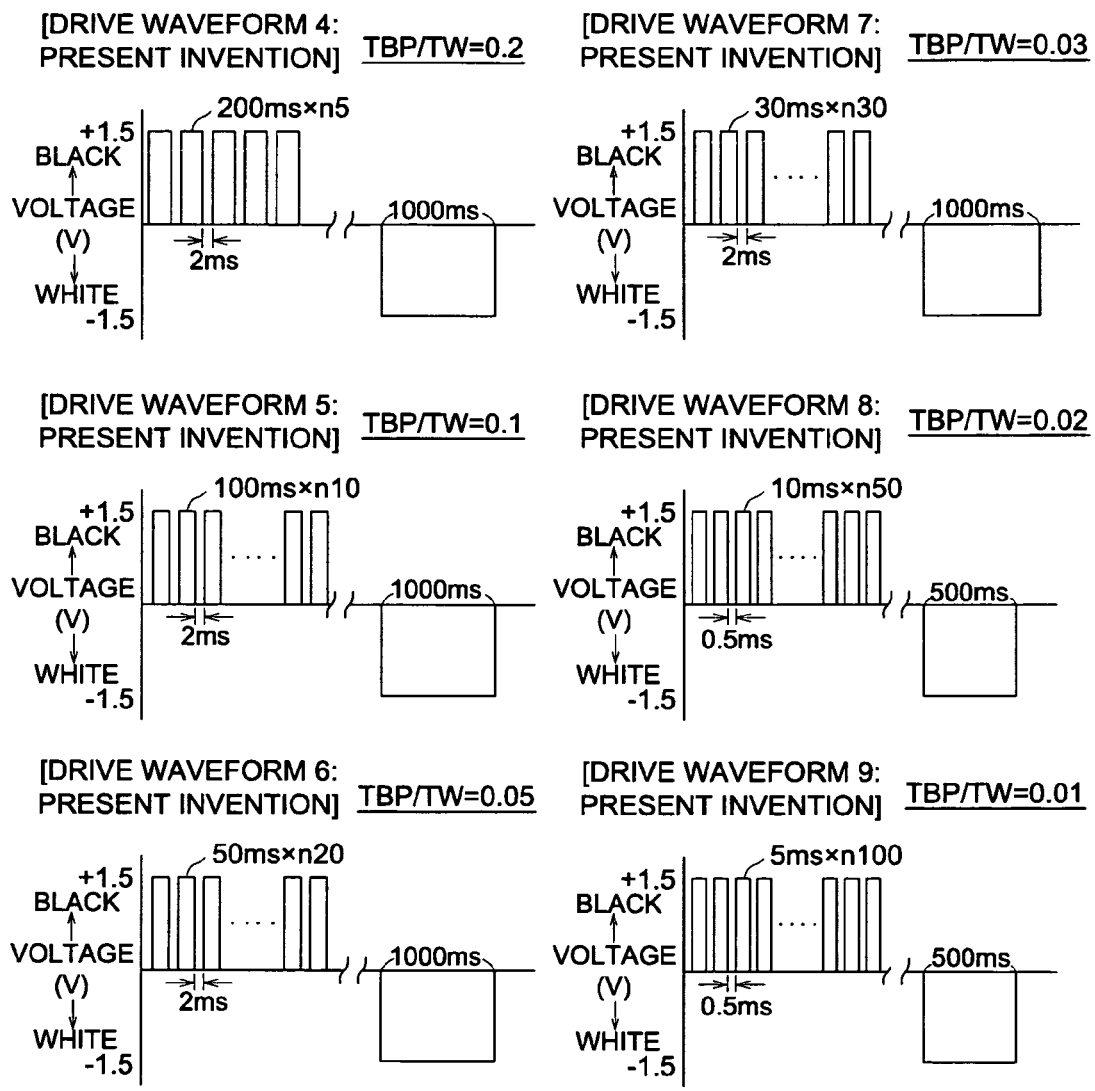
FIG. 11 is a pattern diagram showing drive waveforms of the present invention employed in EXAMPLE.

As to driving methods described below, drive waveforms 1-3 as comparative examples are shown in FIG. 10, and drive waveforms 4-9 of the present invention are shown in FIG. 11.

<Drive Waveform 1>

In the case of driving method 1, similarly to the foregoing FIG. 2a, a single pulse was employed as each of an applied pulse during black display and an applied pulse during white display. The driving was conducted with an applied voltage of +1.5 V and an applied time of 1000 ms (TBP) during black display, and the driving was also conducted with an applied voltage of −1.5 V and an applied time of 1000 ms (TW) during white display, resulting in TBP/TW being 1.0.

<Drive Waveform 2>

In the case of waveform 2 with respect to waveform 1, the applied pulse during black display was divided into three, and the driving was conducted with an applied voltage of +1.5 V, an applied time of each pulse of 300 ms (TBP) and a pulse interval of 2 ms, and with an applied voltage of −1.5 V and an applied time of 1200 ms (TW) during white display, resulting in TBP/TW being 0.25.

<Drive Waveform 3>

In the case of waveform 3 with respect to waveform 1, the applied pulse during black display was divided into one hundred twenty five, and the driving was conducted with an applied voltage of +1.5 V, an applied time of each pulse of 8 ms TBP) and a pulse interval of 2 ms, and with an applied voltage of −1.5 V and an applied time of 1000 ms (TW) during white display, resulting in TBP/TW being 0.008.

<Drive Waveforms 4-9>

With respect to the above-described waveforms 2 and 3, the number of applied pulses (n), applied time of pulse (ms) (TBP) and pulse interval (ms) during black display, and applied time (ms) during white display were changed as described in FIG. 11, and the resulting were designated as drive waveforms 4-9.

<<Evaluation of Display Element>>

[Evaluation of White Display Stability]

Reflectance W1 at a wavelength of 550 nm in the white display state of display element 1 was determined employing a spectro-colorimeter CM-3700d, manufactured by Konica Minolta Sensing, Inc. Next, in driving method 1, after driving display element 1 one thousand times with drive waveform 1, Reflectance W2 at a wavelength of 550 nm in the white display state was similarly determined to calculate a reflectance ratio of W2/W1. As to driving methods 2-19 employing any one of the display elements and any one of the drive waveforms in combination as shown in Table 1, evaluations are made similarly to the above to determine each of the ratios of W2/W1, and obtained results are shown in Table 1. When W2/W1 is nearer to 1, it is indicated that the variation of white reflectance is further reduced.

TABLE 1

| Driving method No. | Display element No. | Drive waveform No. | Reflectance ratio W2/W1 | Remarks |
|---|---|---|---|---|
| 1 | 1 | 1 | 0.59 | Comparative example |
| 2 | 2 | 2 | 0.61 | Comparative example |
| 3 | 3 | 3 | 0.57 | Comparative example |
| 4 | 4 | 1 | 0.59 | Comparative example |
| 5 | 5 | 2 | 0.63 | Comparative example |
| 6 | 6 | 3 | 0.64 | Comparative example |
| 7 | 7 | 1 | 0.59 | Comparative example |
| 8 | 1 | 4 | 0.70 | Present invention |
| 9 | 1 | 5 | 0.71 | Present invention |
| 10 | 1 | 6 | 0.82 | Present invention |
| 11 | 1 | 7 | 0.83 | Present invention |
| 12 | 1 | 8 | 0.80 | Present invention |
| 13 | 1 | 9 | 0.72 | Present invention |
| 14 | 2 | 7 | 0.84 | Present invention |
| 15 | 3 | 7 | 0.85 | Present invention |
| 16 | 4 | 7 | 0.86 | Present invention |
| 17 | 5 | 7 | 0.91 | Present invention |
| 18 | 6 | 7 | 0.95 | Present invention |
| 19 | 7 | 7 | 0.99 | Present invention |

As is clear from Table 1, it is to be understood that in the case of the driving method of the present invention in which a pulse is applied in the range of TBP/TW between 0.01 and 0.20 to repeatedly conduct black display and white display, white reflectance variation during white display is small in comparison to Comparative example. Further, it is also to be understood that effects of the present invention are further produced by changing the configuration of an electrolyte together with the drive waveform as described in the present invention. For example, see examples of driving method 6 together with display element 6 and drive waveform 3, and driving method 18 together with display element 6 and drive waveform 7.

The invention claimed is:

1. A method of driving a display element in which an electrolyte comprising silver or a compound containing silver in a chemical structure thereof is contained between facing electrodes, comprising the step of:
    applying a driving operation to the facing electrodes so as to induce dissolution and deposition of silver,
    wherein an impression necessary for displaying black color is the impression of a pulse applied to the facing electrodes, satisfying the following Expression (1):

$$1/100 \leq TBP/TW \leq 1/5 \quad \text{Expression (1)}$$

where TBP represents time width (ms) of one pulse applied in an applied direction necessary for black display, and TW represents the sum of applied time (ms) in an applied direction necessary for white display after conducting the black display employing the applied pulse.

2. The method of claim 1,
    wherein TBP in Expression (1) is 10-50 ms.
3. The method of claim 1,
    wherein the electrolyte contains at least one of a compound represented by Formula (1) and a compound represented by Formula (2), and at least one of a compound represented by Formula (3) and a compound represented by Formula (4):

Formula (1)

where L represents an oxygen atom or $CH_2$, and each of $R_1$-$R_4$ represents a hydrogen atom, an alkyl group, an alkenyl group, an aryl group, a cycloalkyl group, an alkoxyalkyl group or an alkoxy group:

Formula (2)

where each of $R_5$ and $R_6$ represents a hydrogen atom, an alkyl group, an alkenyl group, an aryl group, a cycloalkyl group, an alkoxyalkyl group or an alkoxy group:

Formula (3)

where each of $R_7$ and $R_8$ represents a substituted or unsubstituted hydrocarbon group, but takes no aromatic group when forming a ring including a S atom:

Formula (4)

where M is a hydrogen atom, a metal atom or quaternary ammonium; Z represents a nitrogen-containing heterocycle other than imidazole rings; "n" represents an integer of 0-5; and $R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic group, provided that when "n" is at least 2, $R_9$s each may be the same or different, and the $R_9$s may be joined to each other to form a condensed ring.

4. The method of claim 1,
    wherein Expression (2) is satisfied, provided that [X] represents a molar concentration (mol/kg) of halogen ions or halogen atoms contained in the electrolyte, and [Ag] represents the total molar concentration (mol/kg) of silver contained in the foregoing electrolyte, or of silver in a compound containing silver in a chemical structure thereof contained in the electrolyte:

$0 \leq [X]/[Ag] \leq 0.01$.

5. The method of claim 1,
wherein at least one of the facing electrodes is a fluorine-doped tin oxide (FTO) electrode.

6. The method of claim 2,
wherein the electrolyte contains at least one of a compound represented by Formula (1) and a compound represented by Formula (2), and at least one of a compound represented by Formula (3) and a compound represented by Formula (4):

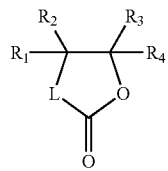

Formula (1)

where L represents an oxygen atom or $CH_2$, and each of $R_1$-$R_4$ represents a hydrogen atom, an alkyl group, an alkenyl group, an aryl group, a cycloalkyl group, an alkoxyalkyl group or an alkoxy group:

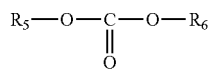

Formula (2)

where each of $R_5$ and $R_6$ represents a hydrogen atom, an alkyl group, an alkenyl group, an aryl group, a cycloalkyl group, an alkoxyalkyl group or an alkoxy group:

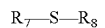

Formula (3)

where each of $R_7$ and $R_8$ represents a substituted or unsubstituted hydrocarbon group, but takes no aromatic group when forming a ring including a S atom:

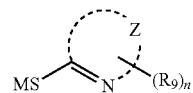

Formula (4)

where M is a hydrogen atom, a metal atom or quaternary ammonium; Z represents a nitrogen-containing heterocycle other than imidazole rings; "n" represents an integer of 0-5; and $R_9$ represents a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, a arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group or a heterocyclic group, provided that when "n" is at least 2, $R_9$s each may be the same or different, and the $R_9$s may be joined to each other to form a condensed ring.

* * * * *